(12) United States Patent  
Yasuoka et al.

(10) Patent No.: US 8,861,004 B2  
(45) Date of Patent: Oct. 14, 2014

(54) READING SYSTEM, TERMINAL APPARATUS, READING APPARATUS, AND INFORMATION PROCESSING METHOD

(71) Applicant: Fuji Xerox Co., Ltd., Tokyo (JP)

(72) Inventors: Daisuke Yasuoka, Kanagawa (JP); Akira Kadoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 66 days.

(21) Appl. No.: 13/757,112

(22) Filed: Feb. 1, 2013

(65) Prior Publication Data

US 2014/0043642 A1 Feb. 13, 2014

(30) Foreign Application Priority Data

Aug. 9, 2012 (JP) ................. 2012-177593

(51) Int. Cl.
- *G06F 3/12* (2006.01)
- *G06K 15/00* (2006.01)
- *G06F 7/04* (2006.01)
- *H04N 1/00* (2006.01)

(52) U.S. Cl.
CPC .... *H04N 1/00854* (2013.01); *H04N 2201/0094* (2013.01); *H04N 1/00225* (2013.01); *H04N 1/00307* (2013.01); *H04N 1/00973* (2013.01)
USPC ....... 358/1.15; 358/1.14; 358/1.13; 358/1.16; 726/7

(58) Field of Classification Search
None
See application file for complete search history.

(56) References Cited

U.S. PATENT DOCUMENTS

| | | | |
|---|---|---|---|
| 2007/0177920 A1* | 8/2007 | Katano et al. | 400/76 |
| 2007/0206218 A1* | 9/2007 | Ohmori | 358/1.15 |
| 2009/0025072 A1* | 1/2009 | Kondo | 726/7 |

FOREIGN PATENT DOCUMENTS

JP 2003-107962 A 4/2003

* cited by examiner

*Primary Examiner* — Thomas Lett
(74) *Attorney, Agent, or Firm* — Sughrue Mion, PLLC

(57) ABSTRACT

A reading system includes a reading apparatus and a terminal apparatus. The reading apparatus includes following components. An identification unit identifies a first user. A reading unit reads an original document. A reception unit receives, from the terminal apparatus, authentication information of a second user and an instruction. An authentication unit performs authentication using the authentication information. A permission unit permits, if authentication is successful, the reading unit to read an original document in accordance with the instruction. The terminal apparatus includes following components. A first acquisition unit acquires, from the reading apparatus, identification information of the first user. The acceptance unit accepts an operation of the second user. The second acquisition unit acquires identification information of the second user. The transmission unit transmits, if the pieces of identification information satisfy a certain condition, an instruction corresponding to the accepted operation and the authentication information to the reading apparatus.

12 Claims, 7 Drawing Sheets

| USER NAME | ID | PASSWORD | FAX TRANSMISSION | COLOR READING | COLOR COPYING |
|---|---|---|---|---|---|
| USER A | A | USER-A | PERMITTED | PERMITTED | PERMITTED |
| USER B | B | USER-B | PERMITTED | PERMITTED | PROHIBITED |
| USER C | C | USER-C | PERMITTED | PROHIBITED | PROHIBITED |

READING SYSTEM, TERMINAL APPARATUS, READING APPARATUS, AND INFORMATION PROCESSING METHOD

CROSS-REFERENCE TO RELATED APPLICATIONS

This application is based on and claims priority under 35 USC 119 from Japanese Patent Application No. 2012-177593 filed Aug. 9, 2012.

BACKGROUND

Technical Field

The present invention relates to a reading system, a terminal apparatus, a reading apparatus, and an information processing method.

SUMMARY

According to an aspect of the invention, there is provided a reading system including a reading apparatus and a terminal apparatus that transmits an instruction to the reading apparatus. The reading apparatus includes an identification unit, a reading unit, a reception unit, an authentication unit, and a permission unit. The identification unit identifies a first user. The reading unit reads an original document. The reception unit receives, from the terminal apparatus, authentication information of a second user and an instruction given to the reading apparatus. The authentication unit performs authentication by using the authentication information. The permission unit permits, if authentication performed by the authentication unit is successful, the reading unit to read an original document in accordance with the instruction received by the reception unit. The terminal apparatus includes a first acquisition unit, an acceptance unit, a second acquisition unit, and a transmission unit. The first acquisition unit acquires, from the reading apparatus, identification information of the first user identified by the identification unit in the reading apparatus. The acceptance unit accepts an operation performed by the second user. The second acquisition unit acquires identification information of the second user in the terminal apparatus. The transmission unit transmits, if the identification information of the first user acquired by the first acquisition unit and the identification information of the second user acquired by the second acquisition unit satisfy a certain condition, an instruction corresponding to the operation accepted by the acceptance unit and the authentication information to the reading apparatus.

BRIEF DESCRIPTION OF THE DRAWINGS

Exemplary embodiments of the present invention will be described in detail based on the following figures, wherein.

DETAILED DESCRIPTION

1. First Exemplary Embodiment

1-1. Configuration of Reading System

Figure 1:
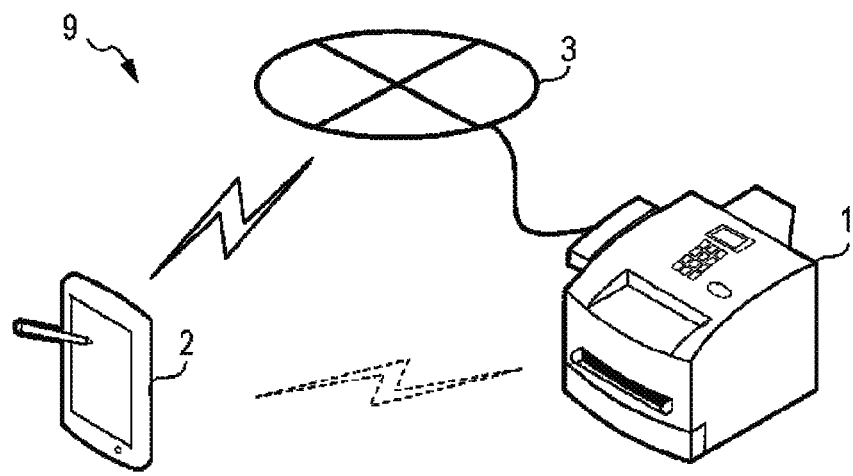
FIG. 1 illustrates an overall configuration of a reading system according to a first exemplary embodiment.

FIG. 1 illustrates an overall configuration of a reading system 9 according to a first exemplary embodiment of the present invention. The reading system 9 includes a reading apparatus 1, a terminal apparatus 2, and a communication network 3. The communication network 3 enables communication between the reading apparatus 1 and the terminal apparatus 2. FIG. 1 illustrates one terminal apparatus 2 but the reading system 9 may include multiple terminal apparatuses 2. Also, the reading apparatus 1 and the terminal apparatus 2 communicate with each other via the communication network 3 in the reading system 9. However, as illustrated by a dotted line in FIG. 1, the reading apparatus 1 and the terminal apparatus 2 may directly communicate with each other by using, for example, the ad hoc mode of the wireless local area network (LAN).

1-2. Configuration of Reading Apparatus

Figure 2:
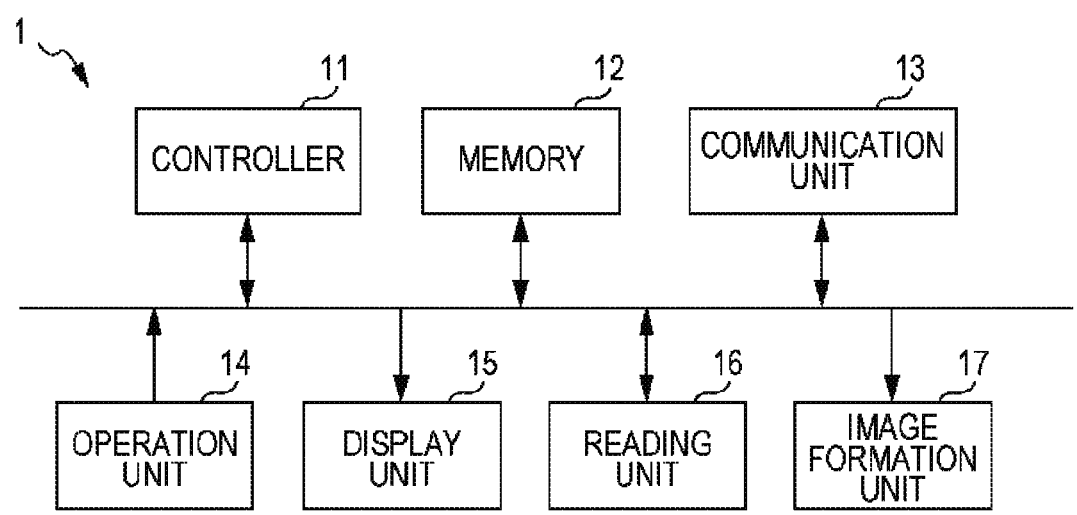
FIG. 2 illustrates a configuration of a reading apparatus according to the first exemplary embodiment.

FIG. 2 illustrates a configuration of the reading apparatus 1. The reading apparatus 1 includes a controller 11, a memory 12, a communication unit 13, an operation unit 14, a display unit 15, a reading unit 16, and an image formation unit 17.

The controller 11 controls operations of the individual components of the reading apparatus 1. The controller 11 includes an arithmetic processing device, such as a central processing unit (CPU), and storage devices, such as a read only memory (ROM) and a random access memory (RAM). The controller 11 executes programs stored in these storage devices or the memory 12, thereby controlling the individual components of the reading apparatus 1.

Figures 3, 4:
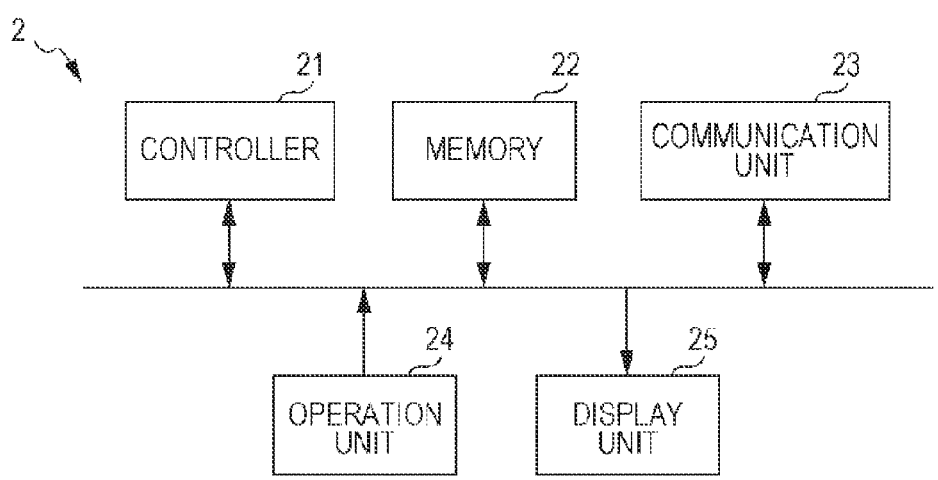
FIG. 3 illustrates a table in which information on a list of services permitted for each user and the user name, the ID, and the password of the user are associated with each other in the reading apparatus according to the first exemplary embodiment.
FIG. 4 illustrates a configuration of a terminal apparatus according to the first exemplary embodiment.

The memory 12 is a mass storage device, such as a hard disk drive, and stores programs and various kinds of data loaded by the controller 11. The memory 12 also stores authentication information used to authenticate the user of the reading apparatus 1. The authentication information includes, for example, the user name associated with the user who is permitted to use the reading apparatus 1, and the identification (ID) and the password of the user. The authentication information may also include, for example, information on a list of services which each user is permitted to execute in the reading apparatus 1. FIG. 3 illustrates a table in which information on a list of services which each user is permitted to execute and the user name, the ID, and the password of the user are associated with each other. In the information on the list illustrated in FIG. 3, a user A is authorized to execute a "fax transmission function", a "color reading function" for reading an original document in color, and a "color copying function" for copying an original document in color in the reading apparatus 1. A user B is authorized to execute the "fax transmission function" and the "color reading function" but is not authorized to execute the "color copying function" in the reading apparatus 1. A user C is authorized to execute the "fax transmission function" but is not authorized to execute the "color reading function" and the "color copying function" in the reading apparatus 1. Also, the ID and the password are associated with each user.

Examples of the storage devices included in the controller 11 and the memory 12 may include so-called removable disks, i.e., removable recording media.

The communication unit 13 is an interface that performs communication with the terminal apparatus 2 to exchange information. Examples of the communication unit 13 include various modems, a wireless communication circuit based on IMT-2000, a serial interface based on universal serial bus (USB), and a wireless interface based on infrared data association (IrDA) or Bluetooth (registered trademark). The communication unit 13 may also have a fax function, for example.

The operation unit 14 includes operation buttons and a coordinate acquisition unit that acquires information representing coordinates to accept various instructions. The operation unit 14 accepts an operation performed by the user, and provides the controller 11 with a signal corresponding to a content of the operation.

The display unit 15 is a display device using liquid crystals or the like, and displays an image on a display surface in accordance with an instruction fed from the controller 11. The coordinate acquisition unit of the operation unit 14 may be arranged on the display surface of the display unit 15.

The reading unit 16 executes a process of optically reading an original document and of generating image data.

The image formation unit 17 forms, on a medium, an image based on image data specified by the controller 11.

1-3. Configuration of Terminal Apparatus

FIG. 4 illustrates a configuration of the terminal apparatus 2. The terminal apparatus 2 includes a controller 21, a memory 22, a communication unit 23, an operation unit 24, and a display unit 25. The controller 21 controls operations of the individual components of the terminal apparatus 2.

The controller 21 includes an arithmetic processing device, such as a CPU, and storage devices, such as a ROM and a RAM. The controller 21 executes programs stored in these storage devices or the memory 22, thereby controlling the individual components of the terminal apparatus 2. The memory 22 is a mass storage device, such as a solid-state drive, and stores programs and various kinds of data loaded by the controller 21. The communication unit 23 is an interface that performs communication with the reading apparatus 1 to exchange information. Examples of the communication unit 23 include various modems, a wireless communication circuit based on IMT-2000, a serial interface based on USB, and a wireless interface based on IrDA or Bluetooth (registered trademark).

The operation unit 24 includes operation buttons and a coordinate acquisition unit that acquires information representing coordinates to accept various instructions. The operation unit 24 accepts an operation performed by the user, and provides the controller 21 with a signal corresponding to a content of the operation. The display unit 25 is a display device using liquid crystals or the like, and displays an image on a display surface in accordance with an instruction fed from the controller 21. The coordinate acquisition unit of the operation unit 24 may be arranged on the display surface of the display unit 25.

1-4. Functional Configuration of Reading System

Figure 5:
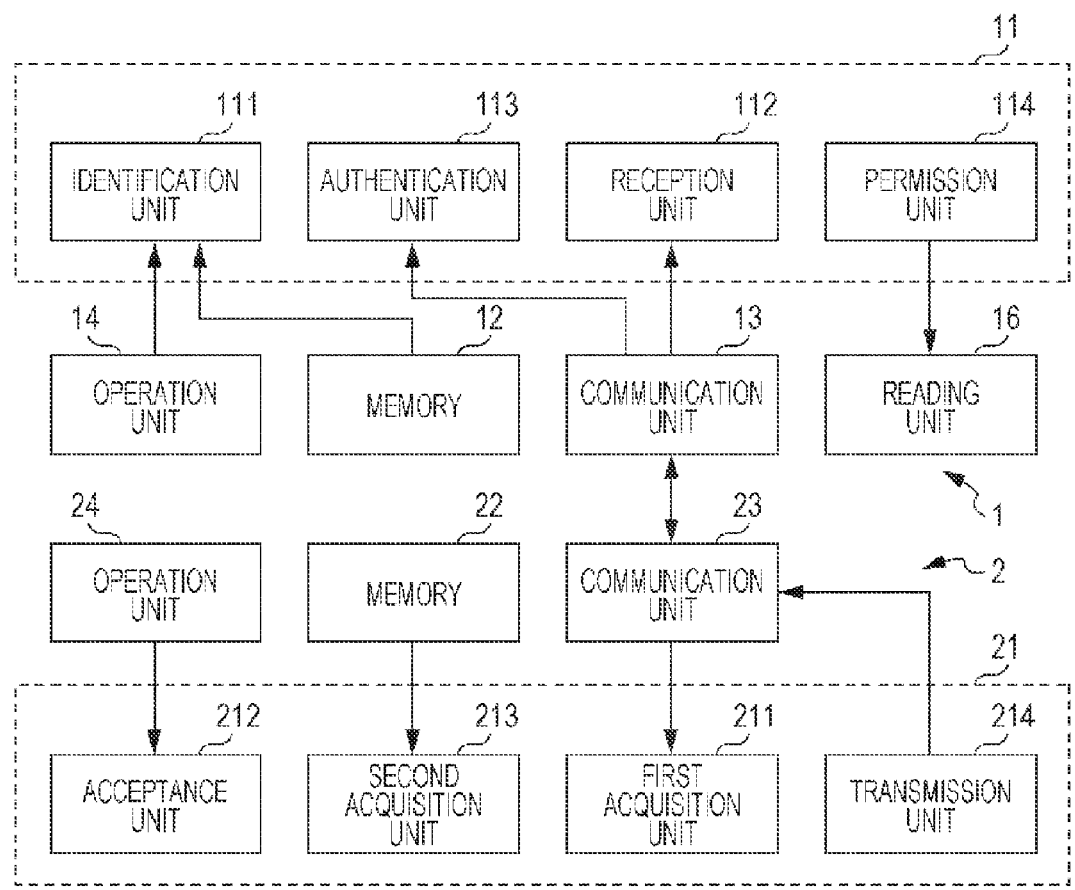
FIG. 5 illustrates a functional configuration of the reading system according to the first exemplary embodiment.

FIG. 5 illustrates a functional configuration of the reading system 9. The controller 11 of the reading apparatus 1 executes the above-described program, thereby functioning as an identification unit 111, a reception unit 112, an authentication unit 113, and a permission unit 114. The controller 21 of the terminal apparatus 2 executes the above-described program, thereby functioning as a first acquisition unit 211, an acceptance unit 212, a second acquisition unit 213, and a transmission unit 214.

The identification unit 111 identifies the user who provides an original document. Specifically, the reading apparatus 1 includes, for example, a card reader that reads an integrated circuit (IC) card owned by the user via non-contact communication or the like and that acquires identification information of the user. The identification unit 111 controls this card reader and acquires the identification information of the user, thereby identifying this user. The card reader is placed physically within arm's reach from the original document reading position of the reading unit 16. Accordingly, the identification information read by this card reader is considered to be identification information of the user (hereinafter, referred to as a first user) who provides an original document to the reading unit 16. The identification unit 111 identifies the first user by using the card reader but the identification unit 111 may identify the first user by using another device or mechanism. That is, the identification unit 111 identifies the user who directly operates the reading apparatus 1 as the first user. The expression "to operate the reading apparatus 1" used herein includes various operations that allow the identification unit 111 of the reading apparatus 1 to identify the user.

The terminal apparatus 2 accepts an operation performed by a user, and transmits an instruction corresponding to the operation to the reading apparatus 1 if a certain condition is met. Hereinafter, the user who operates the terminal apparatus 2 is referred to as a second user. This second user is not necessarily the same as the above-described first user. That is, the second user who operates the terminal apparatus 2 may be, for example, a person who is at a position separated from the reading unit 16 of the reading apparatus 1 and does not provide this reading unit 16 with an original document.

The reception unit 112 controls the communication unit 13 and receives an instruction given to the reading unit 16 from the terminal apparatus 2 operated by the second user. The authentication unit 113 controls the communication unit 13, acquires authentication information of the second user, and performs authentication. The permission unit 114 permits the reading unit 16 to read an original document in accordance with an instruction received by the reception unit 112 if authentication performed by the authentication unit 113 is successful.

The first acquisition unit 211 controls the communication unit 23 and acquires identification information of the first user identified by the identification unit 111 in the reading apparatus 1. The acceptance unit 212 controls the operation unit 24, and accepts an operation performed by the second user. The second acquisition unit 213 acquires identification information of the second user pre-stored in the memory 22, for example. If the identification information of the first user acquired by the first acquisition unit 211 and the identification information of the second user acquired by the second acquisition unit 213 satisfy a certain condition, the transmission unit 214 transmits an instruction corresponding to the operation accepted by the acceptance unit 212 to the reading apparatus 1.

Here, the certain condition may be any condition. For example, the certain condition may be a condition that the above-described two pieces of identification information match one another. Also, in the case where each of the identification information of the first user and the identification information of the second user is constituted by a combination of identification information of a group to which the user belongs and identification information of the user within the group, this certain condition may be a condition that pieces of identification information of groups contained in these two pieces of identification information match one another.

1-5. Operation of Reading System

Figure 6:
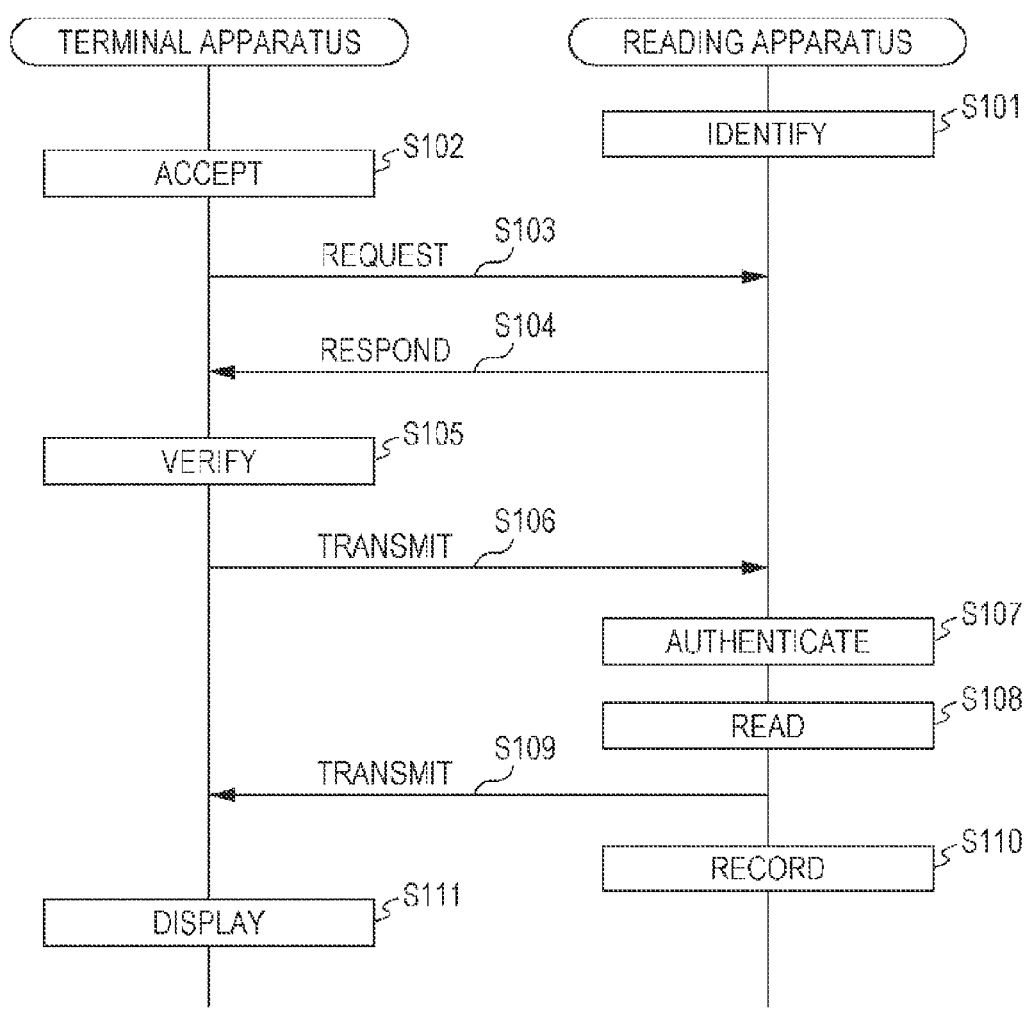
FIG. 6 is a sequence diagram illustrating a flow of an operation performed in the reading system according to the first exemplary embodiment.

FIG. 6 is a sequence diagram illustrating a flow of an operation performed in the reading system 9. The first user places their IC card over the card reader of the reading apparatus 1. Then, the controller 11 of the reading apparatus 1 controls the card reader, and acquires identification information of the first user which this card reader has read from the IC card. In this manner, the controller 11 identifies the first user (step S101).

On the other hand, the controller 21 of the terminal apparatus 2 controls the operation unit 24, and accepts an operation performed by the second user (step S102). The controller 21 analyzes the accepted operation. If the controller 21 identifies that this operation represents an instruction for causing the reading unit 16 of the reading apparatus 1 to read an original document, the controller 21 requests this reading apparatus 1 to transmit the identification information of the first user identified by the reading apparatus 1 (step S103). Specifically, the instruction for causing the reading unit 16 of the reading apparatus 1 to read an original document includes various parameters used in a reading process, such as the color mode that determines the color in which the original document is to be read, the format of image data to be generated, a resolution in reading, a setting regarding whether or not to enable double-sided reading, the image quality of the original document, the reading size, and the orientation of the original document. Also, this instruction may include identification information of the reading apparatus 1 and identification information of a destination to which generated image data resulting from reading is to be transmitted.

In response to the request, the reading apparatus 1 returns the identification information of the first user (step S104). The controller 21 of the terminal apparatus 2 verifies the identification information of the first user acquired through this response with identification information of the second user that is pre-stored in the memory 22 or the like (step S105).

If the identification information of the first user matches the identification information of the second user as a result of this verification and these pieces of identification information satisfy the above-described "certain condition", the controller 21 of the terminal apparatus 2 controls the communication unit 23, and transmits to the reading apparatus 1 an instruction corresponding to the operation that has been accepted in step S102 (step S106). Along with this instruction, the controller 21 also transmits authentication information of the second user to the reading apparatus 1.

If the identification information of the first user does not match the identification information of the second user as a result of the verification, the controller 21 does not transmit the instruction to the reading apparatus 1. In this case, the controller 21 may, for example, control the display unit 25 and display, on the display screen, a warning, such as "unable to read the original document because another user is using the specified reading apparatus".

Upon receiving the instruction and the authentication information of the second user from the terminal apparatus 2, the controller 11 of the reading apparatus 1 performs an authentication process on this authentication information of the second user by using pieces of authentication information of users of the reading apparatus 1 that are pre-stored in the memory 12 (step S107).

Now, it is assumed that, for example, the instruction from the terminal apparatus 2 includes an instruction for "color reading", and the authentication information of the second user includes the ID "A" and the password "USER-A" of the user A. In this case, the controller 11 confirms that the ID "A" and the password "USER-A" of the user A match the ID and the password included in the list stored in the memory 12 as illustrated in FIG. 3. The controller 11 also refers to the list information stored in the memory 12, and confirms that the user A is authorized to execute the function of "color reading". In this manner, the controller 11 permits the reading unit 16 to read the original document. In this case, authentication is successful. Alternatively, it is assumed that, for example, the instruction from the terminal apparatus 2 includes an instruction for "color reading" and the authentication information of the second user includes the ID "C" and the password "USER-C" of the user C. In this case, the controller 11 of the reading apparatus 1 successfully confirms that the ID "C" and the password "USER-C" of the user C match the ID and the password stored in the memory 12. However, the controller 11 refers to the list information stored in the memory 12 and confirms that the user C is prohibited from executing the function of "color reading". Thus, the controller 11 does not permit the reading unit 16 to read the original document. That is, in this case, authentication is unsuccessful.

If authentication is successful in step S107, the controller 11 permits the reading unit 16 to read the original document in accordance with this instruction, and the reading unit 16 reads the original document provided by the first user (step S108).

When the instruction is, for example, an instruction for transmitting image data, generated as a result of reading the original document performed by the reading unit 16, to the terminal apparatus 2 via the communication network 3, the controller 11 of the reading apparatus 1 controls the communication unit 13, and transmits this image data generated by the reading unit 16 to the terminal apparatus 2 (step S109). In this case, the instruction includes, for example, an Internet protocol (IP) address of the terminal apparatus 2 serving as the destination. The reading apparatus 1 identifies the terminal apparatus 2 by using this IP address, and transmits the image data to this terminal apparatus 2.

The instruction is not limited to an instruction for transmitting image data to the terminal apparatus 2 and may be an instruction for causing the image formation unit 17 to form an image represented by the generated image data on a medium. Alternatively, the instruction may be an instruction for causing another reception apparatus to receive the generated image data via a telephone line or the like and for causing the reception apparatus to form an image represented by the image data on a medium. That is, the content of the instruction may be copying of the original document or fax transmission of the original document.

This image data may be transmitted by using a protocol, e.g., file transfer protocol (FTP), server message block (SMB), hypertext transfer protocol (HTTP), web distributed authoring and versioning (WebDAV), or simple object access protocol (SOAP), over which data communication is performed after connection is established. Alternatively, the image data may be transmitted as attached data that is attached to an email by using a mail transfer protocol, such as simple mail transfer protocol (SMTP). In this case, the instruction includes an email address specific to the terminal apparatus 2 or an email address of the second user as the destination. The reading apparatus 1 identifies the terminal apparatus 2 by using these email addresses, and transmits the image data to this terminal apparatus 2. Also, these protocols may be protected by an authentication mechanism using secure sockets layer (SSL)/transport layer security (TLS) or the like.

The controller 11 records the content of this instruction in the memory 12 together with information regarding whether or not reading of the original document performed by the reading unit 16 is successful and information regarding whether or not transmission of the image data performed by the communication unit 13 is successful (step S110).

The transmission performed in step S109 may be performed after recording is performed in step S110. In this case, the controller 11 records the content of this instruction in the memory 12 together with information regarding whether or not reading of the original document performed by the reading unit 16 is successful.

Upon receiving this image data transmitted by the reading apparatus 1, the controller 21 of the terminal apparatus 2 controls the display unit 25 and displays an image represented by this image data on the display screen of the display unit 25 (step S111).

As described above, in the reading system 9, the reading apparatus 1 identifies the first user who provides the original document. If identification information of the second user who operates the terminal apparatus 2 and identification information of the first user identified by the reading apparatus 1 satisfy a certain condition, the terminal apparatus 2 transmits an instruction for causing the reading unit 16 of the reading apparatus 1 to read the original document. With this configuration, in the reading system 9, for example, if identification information of the second user who operates the terminal apparatus 2 and identification information of the first user identified by the reading apparatus 1 do not satisfy a certain condition, the terminal apparatus 2 operated by the second user is prohibited from transmitting an instruction for causing the reading apparatus 1 to read the original document.

In the reading system 9, for example, if identification information of the second user who operates the terminal apparatus 2 does not match identification information of the first user identified by the reading apparatus 1, the terminal apparatus 2 operated by the second user is prohibited from transmitting an instruction for causing the reading apparatus 1 to read the original document. That is, for example, if the terminal apparatus 2 determines that the second user who operates the terminal apparatus 2 differs from the first user identified by the reading apparatus 1, the reading apparatus 1 is prevented from reading the original document provided thereto in accordance with an instruction received from the terminal apparatus 2 operated by the second user.

Furthermore, for example, if identification information of the second user who operates the terminal apparatus 2 does not match identification information of the first user identified by the reading apparatus 1, the terminal apparatus 2 operated by the second user is prohibited from transmitting an instruction for causing the reading apparatus 1 to read the original document. That is, for example, if the terminal apparatus 2 determines that the second user who operates the terminal apparatus 2 differs from the first user identified by the reading apparatus 1, the reading apparatus 1 may be prevented from reading the original document provided thereto in accordance with an instruction received from the terminal apparatus 2 operated by the second user in a state in which the first user is identified by the reading apparatus 1.

Also, as described above, in the reading system 9, if identification information of the second user who operates the terminal apparatus 2 and identification information of the first user identified by the reading apparatus 1 do not satisfy a certain condition, the terminal apparatus 2 determines an instruction given to the reading unit 16 as an invalid instruction and does not transmit the instruction. Consequently, the reading apparatus 1 does not receive an instruction for a reading process, which is to be unsuccessful because of the invalid instruction. Thus, in the case where the controller 11 of the reading apparatus 1 records the instruction given to the reading unit 16 in the memory 12 together with the result for the instruction, the number of times the result of the unsuccessful process is recorded in the memory 12 by the controller 11 is reduced. Also, a communication load imposed on the communication network 3 because of transmission of invalid instructions to the reading apparatus 1 is reduced.

2. Second Exemplary Embodiment

A reading system 9a according to a second exemplary embodiment of the present invention differs from the reading system 9 according to the first exemplary embodiment in that an entity that determines whether or not identification information of a second user and identification information of a first user satisfy a certain condition is a reading apparatus.

Figure 7:
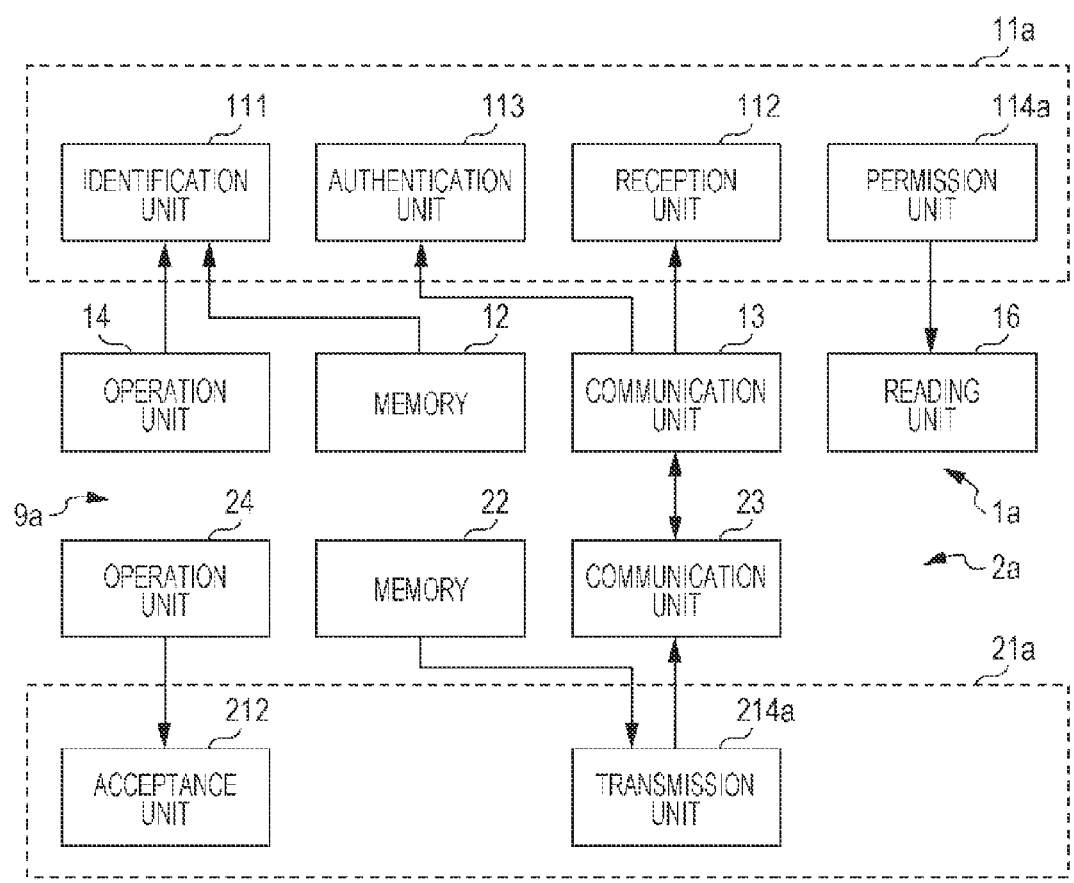
FIG. 7 illustrates a functional configuration of a reading system according to a second exemplary embodiment.

FIG. 7 illustrates a functional configuration of the reading system 9a according to the second exemplary embodiment of the present invention. The reading system 9a includes a reading apparatus 1a, a terminal apparatus 2a, and a communication network 3 not illustrated in FIG. 7. The reading apparatus 1a differs from the reading apparatus 1 described in the first exemplary embodiment in that the reading apparatus 1a includes a controller 11a. Also, the terminal apparatus 2a differs from the terminal apparatus 2 described in the first exemplary embodiment in that the terminal apparatus 2a includes a controller 21a. The controllers 11a and 21a implement functions illustrated in FIG. 7 by executing programs stored in storage devices thereof or the memories 12 and 22.

The controller 21a functions as an acceptance unit 212 and a transmission unit 214a. That is, the controller 21a differs from the controller 21 in that the controller 21a does not function as the first acquisition unit 211 and the second acquisition unit 213. Among these functional units, the transmission unit 214a transmits an instruction corresponding to an operation, which is performed by the second user and accepted by the acceptance unit 212, to the reading apparatus 1a. Thus, the transmission unit 214a differs from the transmission unit 214 implemented by the controller 21. That is, the terminal apparatus 2a transmits an instruction corresponding to an accepted operation to the reading apparatus 1a without determining whether or not identification information of the second user and identification information of the first user satisfy a certain condition.

The controller 11a functions as an identification unit 111, a reception unit 112, an authentication unit 113, and a permission unit 114a. Among these functional units, the permission unit 114a differs from the permission unit 114 implemented by the controller 11. Thus, functions of the permission unit 114a will be described below.

The permission unit 114a first acquires identification information of the second user. This is done, for example, by receiving the identification information from the terminal apparatus 2 via the communication unit 13. The permission unit 114a then determines whether or not identification information of the first user identified by the identification unit 111 and the acquired identification information of the second user satisfy a certain condition and whether or not authentication performed by the authentication unit 113 is successful. If the permission unit 114a determines that the pieces of identification information satisfy the certain condition and that the authentication is successful, the permission unit 114a permits the reading unit 16 to read the original document in accordance with an instruction received by the reception unit 112. That is, the permission unit 114a acquires identification information of the second user, and permits the reading unit 16 to read the original document in accordance with an instruction received by the reception unit 112 if the identification information of the first user identified by the identification unit 111 and the identification information of the second user satisfy the certain condition and the authentication performed by the authentication unit 113 is successful.

Figure 8:
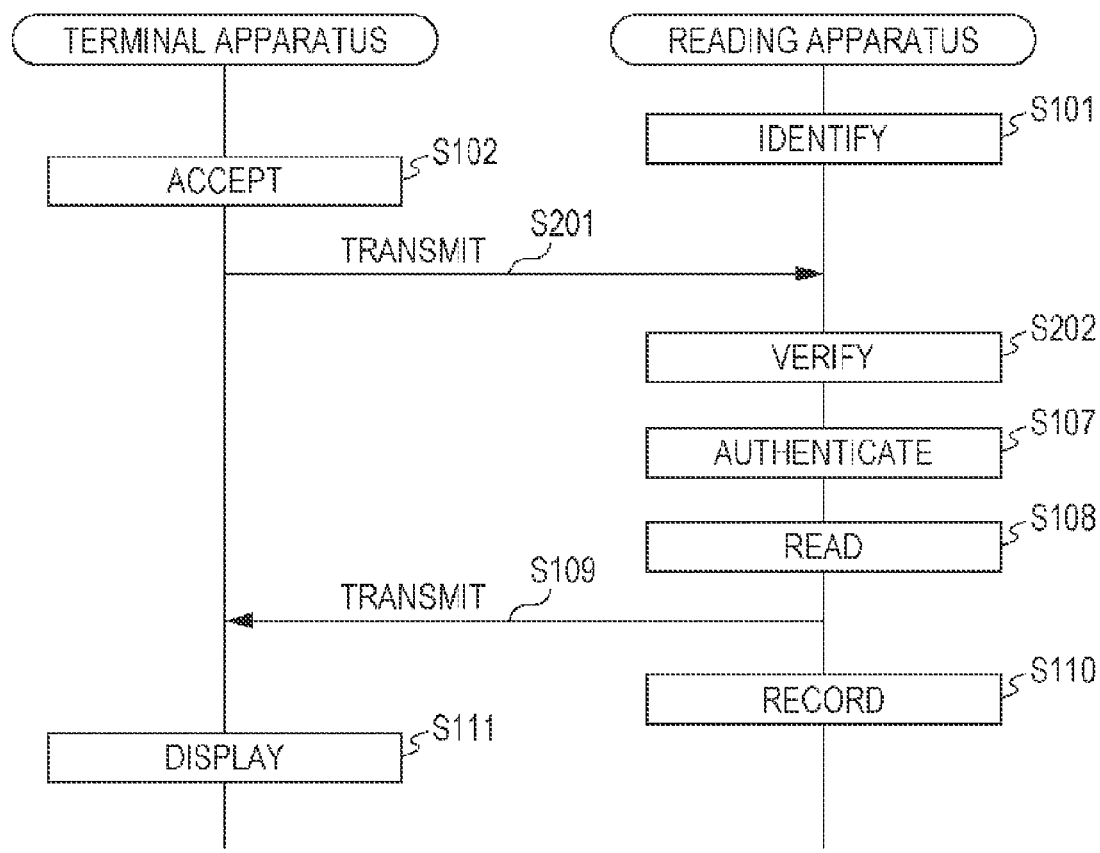
FIG. 8 is a sequence diagram illustrating a flow of an operation performed in the reading system according to the second exemplary embodiment.

FIG. 8 is a sequence diagram illustrating a flow of an operation performed in the reading system 9a. The operation performed in the reading system 9a differs from the operation performed in the reading system 9 in that processing in steps S201 and S202 is performed instead of processing in steps S103 to S106 performed in the reading system 9. Thus, processing in steps S201 and S202 will be described below.

After the controller 21a of the terminal apparatus 2a controls the operation unit 24 to accept an operation performed by the second user in step S102, this controller 21a transmits an instruction corresponding to the accepted operation to the reading apparatus 1a together with identification information of the second user and authentication information of the second user (step S201). The controller 11a of the reading apparatus 1a verifies the identification information of the second user transmitted from the terminal apparatus 2a with identification information of the first user identified in step S101 (step S202).

For example, if the identification information of the first user matches the identification information of the second user as a result of this verification and these pieces of identification information satisfy the above-described "certain condition", the controller 11a of the reading apparatus 1a performs an authentication process by using the received authentication information of the second user and pieces of authentication information of users of the reading apparatus 1a that are pre-stored in the memory 12 (step S107). If the authentication is successful as a result of this authentication process, the controller 11a permits the reading unit 16 to read the original document in accordance with this instruction, and the reading unit 16 reads the original document provided by the first user (step S108).

As described above, in the reading system 9a, the reading apparatus 1a identifies the first user who provides the original document. If identification information of the second user who operates the terminal apparatus 2a and identification information of the identified first user satisfy a certain condition, the reading apparatus 1a permits the reading unit 16 to read the original document in accordance with an instruction received from the terminal apparatus 2a.

Also, for example, in the reading system 9a, the reading apparatus 1a identifies the first user who provides the original document. If identification information of the second user who operates the terminal apparatus 2a matches identification information of the identified first user, the reading apparatus 1a permits the reading unit 16 to read the original document in accordance with an instruction received from the terminal apparatus 2a.

Also, for example, if identification information of the second user who operates the terminal apparatus 2 does not match identification information of the first user identified by the reading apparatus 1a, the reading apparatus 1a is prohibited from reading the original document provided thereto in accordance with an instruction received from the terminal apparatus 2 operated by the second user. That is, for example, in the case where the reading apparatus 1a determines that the second user who operates the terminal apparatus 2a differs from the first user identified by the reading apparatus 1a, the reading apparatus 1a is prohibited from reading the original document provided thereto in accordance with an instruction received from the terminal apparatus 2a operated by the second user.

Furthermore, for example, in the case where the reading apparatus 1a determines that the second user who operates the terminal apparatus 2a differs from the first user identified by the reading apparatus 1a, the reading apparatus 1a may be prohibited from reading the original document provided thereto in accordance with an instruction transmitted from the terminal apparatus 2a operated by the second user in a state where the first user is identified in the reading apparatus 1a.

3. Modifications

The above is the description of the first exemplary embodiment and the second exemplary embodiment. Contents of these exemplary embodiments may be modified in the following manner. Also, modifications described below may be combined with each other. The alphabet "a" attached to the reference numerals of components in the second exemplary embodiment is omitted unless otherwise mentioned below.

3-1. First Modification

In the exemplary embodiments described above, the identification unit 111 implemented by the controller 11 of the reading apparatus 1 identifies the first user who provides the original document to the reading unit 16 by causing the card reader to read an IC card owned by the first user. However, the method used to identify the first user is not limited to the IC card. For example, the identification unit 111 may identify the first user based on biological features. That is, the reading apparatus 1 may identify this first user by using so-called biometrics authentication technologies in which the fingerprint or the shape of the vein of the first user is read or in which voice of the first user is analyzed and the formant is extracted, thereby identifying the first user. Also, the identification unit 111 may prompt the first user to input the code number known by the first user and identify this first user. In this case, the first user inputs the code number by using the operation unit 14.

3-2. Second Modification

In the exemplary embodiments described above, the reading apparatus 1 includes the operation unit 14 and the display unit 15. However, the reading apparatus 1 need not include these components. In this case, operation of the reading apparatus 1 may be performed by using the operation unit 24 of the terminal apparatus 2 and information that the user is informed of by the reading apparatus 1 may be presented by using the display unit 25 of the terminal apparatus 2. Alternatively, the reading apparatus 1 may include one of or both of the image formation unit 17 and the communication unit 13 having the fax function.

3-3. Third Modification

In the exemplary embodiments described above, the reading apparatus 1 does not accept an operation performed by the first user via the operation unit 14. However, the reading apparatus 1 may accept an operation performed by the first user via the operation unit 14. In this case, the controller 11 may function as a reading controller that accepts an operation performed by the first user via the operation unit 14 and that causes the reading unit 16 to read the original document in response to this operation.

Also, in this case, for a period during which the reading unit 16 is permitted by the controller 11 (the permission unit 114) to read the original document in accordance with an instruction received from the terminal apparatus 2 operated by the second user, the controller 11 may restrict the operation unit 14 from accepting an operation performed by the first user. Alternatively, for this period, the operation unit 14 may accept an operation performed by the first user but the controller 11 may restrict the reading unit 16 from reading the original document in response to the accepted operation. That is, the controller 11 may function as a restriction unit that restricts the reading controller from accepting an operation or that restricts the reading unit 16 from reading the original document in response to an operation accepted by the reading controller, for a period during which the reading unit 16 is permitted by the permission unit 114 to read the original document.

Figure 9:
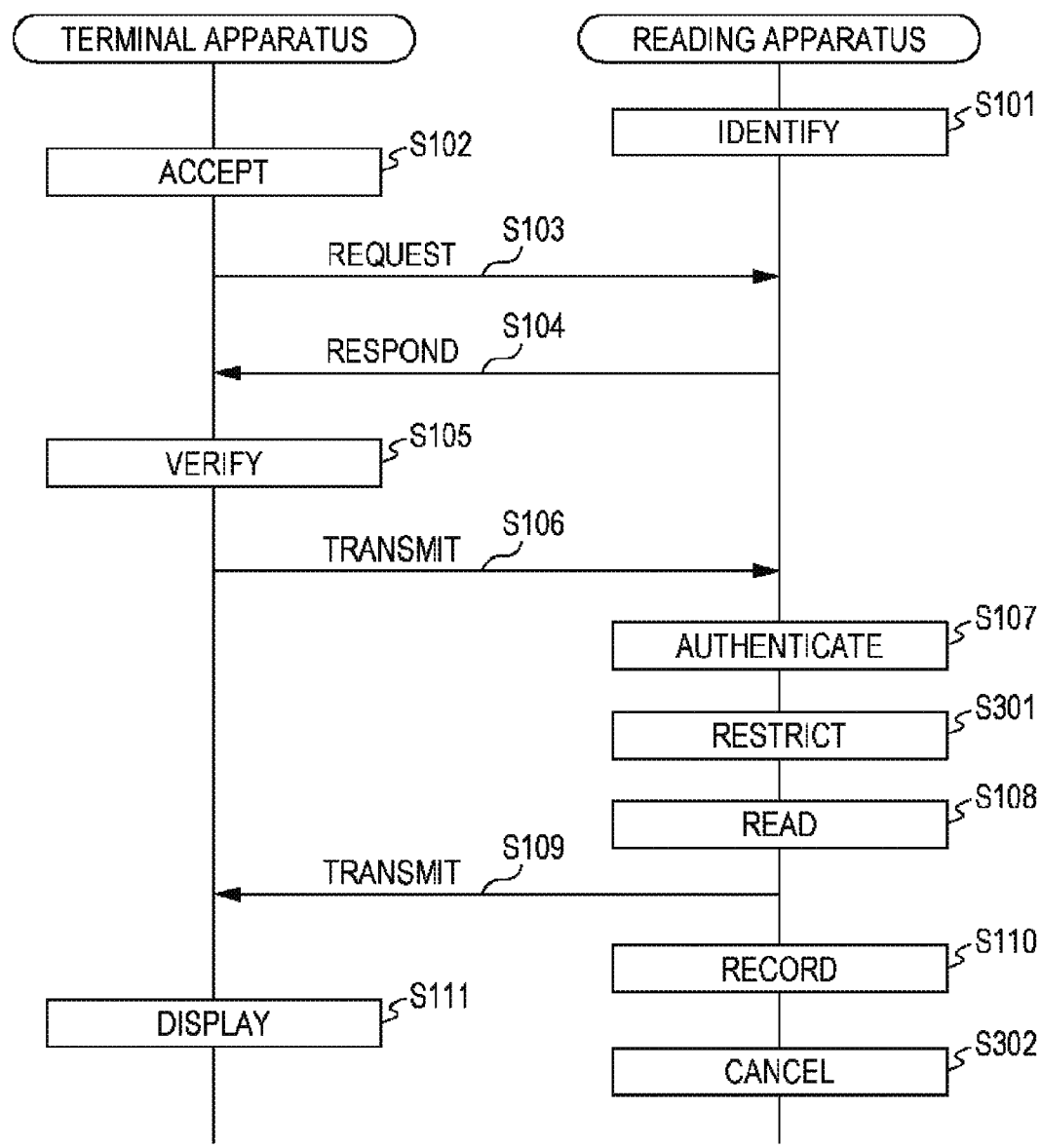
FIG. 9 is a sequence diagram illustrating a flow of an operation performed in a reading system according to a modification.

FIG. 9 is a sequence diagram illustrating a flow of an operation performed in the reading system 9 according to this modification. The operation performed in the reading system 9 according to this modification differs from the operation performed in the reading system 9 according to the first exemplary embodiment in that this operation includes steps S301 and S302. Accordingly, steps S301 and S302 will be described below.

If authentication is successful as a result of an authentication process performed in step S107, the controller 11 of the reading apparatus 1 restricts the operation unit 14 from accepting an operation performed by the first user (step S301). Specifically, the controller 11 stops accepting an instruction for causing the reading unit 16 to read the original document among instructions of this operation. That is, the operation unit 14 accepts, for example, an operation for causing the image formation unit 17 to form an image from the first user but does not accept an operation that involves the reading unit 16. The controller 11 permits the reading unit 16 to read the original document in accordance with the instruction received from the terminal apparatus 2. The reading unit 16 reads the original document provided by the first user in step S108. If authentication is successful as a result of the authentication process, the controller 11 may prohibit the reading unit 16 from reading the original document in accordance with an instruction corresponding to an operation of the first user accepted by the operation unit 14.

After recording contents of the instruction in the memory 12 together with information regarding whether or not reading of the original document performed by the reading unit 16 is successful and information regarding whether or not transmission of image data performed by the communication unit 13 is successful in step S110, the controller 11 cancels the restriction imposed on the first user in step S301 (step S302).

With this configuration, the operation unit 14 is restricted for a period during which the reading unit 16 is reading the original document in accordance with an instruction received from the terminal apparatus 2.

3-4. Fourth Modification

In the third modification descried above, the reading apparatus 1 does not inform the first user of information on restriction by using the display unit 15. However, the reading apparatus 1 may inform the first user of the restriction imposed on the first user by using the display unit 15. For example, for a period during which the reading unit 16 is permitted by the controller 11 to read the original document in accordance with an instruction received from the terminal apparatus 2 operated by the second user, the controller 11 may inform by using the display unit 15 the first user that the operation unit 14 is restricted from accepting an operation performed by the first user. For example, during the period, the controller 11 may inform by using the display unit 15 the first user that the reading unit 16 is restricted from reading the original document in response to an operation accepted by the operation unit 14. That is, the controller 11 may function as an informing unit that informs, by using the display unit 15, the first user that restriction is imposed for a period during which the reading unit 16 is permitted to read the original document in accordance with an instruction received from the terminal apparatus 2.

With this configuration, the first user is informed of restriction imposed on the operation unit 14 for a period during which the reading unit 16 is reading the original document in accordance with an instruction received from the terminal apparatus 2.

The informing is not limited to informing through displaying performed by using the display unit 15. For example, in the case where the reading apparatus 1 includes a speaker that emits a predetermined sound under control of the controller 11, the controller 11 may inform, by using this speaker, the first user that the first user is restricted from operating the reading unit 16 via the operation unit 14 for a period during which the terminal apparatus 2 is permitted to read the original document by using the reading unit 16. That is, in the reading system 9, the reading apparatus 1 informs the first user that the first user is restricted from issuing an instruction for causing the reading unit 16 to read the original document by operating the operation unit 14 for a period during which the reading unit 16 is permitted to read the original document in accordance with an instruction received from the terminal apparatus 2.

3-5. Fifth Modification

In the exemplary embodiments described above, it is not mentioned that the second user of the terminal apparatus 2 is billed for using the reading apparatus 1 in response to a reading process performed on the original document by the reading apparatus 1. However, the second user may be billed for using the reading apparatus 1. In this case, for example, when a reading process which the reading apparatus 1 has caused the reading unit 16 to perform in accordance with an instruction received from the terminal apparatus 2 is successful, the reading apparatus 1 may notify the terminal apparatus 2 that the process is successful and may bill the second user based on billing information associated in advance with the terminal apparatus 2. Here, the billing information may be any information necessary for billing the fee. For example, the billing information may be information for identifying the user who is operating the terminal apparatus 2 and an entity to be billed. That is, the billing information may contain authentication information of the second user and the credit card number of the second user stored in the terminal apparatus 2. Alternatively, the billing information may be stored in the terminal apparatus 2 so that information identifying the user who is operating the terminal apparatus 2 and the usage amount are associated with each other. In this case, a billing process completes by outputting the billing information stored in the terminal apparatus 2 to outside of the terminal apparatus 2 at a certain timing.

If the content of an instruction received from the terminal apparatus 2 is to transmit image data generated by the reading unit 16 to the terminal apparatus 2, the terminal apparatus 2 may transmit, to the reading apparatus 1, a notification indicating that this reading process is successful upon successfully receiving the image data. In this case, the reading apparatus 1 determines whether or not the reading process is successful in accordance with the notification received from the terminal apparatus 2. Upon determining that the reading process is successful, the reading apparatus 1 performs the billing process described above. Whether or not the image data is successfully received by the terminal apparatus 2 may be determined by comparing a hash value that is calculated at the transmission side and that is transmitted together with the image data with a hash value that is calculated from the image data at the reception side or by using a known error detection code.

If the content of an instruction received from the terminal apparatus 2 is to transmit image data generated by the reading unit 16 to another image forming apparatus via a telephone line or the like and to cause the image forming apparatus to form an image represented by the image data on a medium, the reading apparatus 1 determines whether or not the reading process is successful in accordance with communication with the image forming apparatus to which the image data is transmitted. Upon determining that the reading process is successful, the reading apparatus 1 performs the billing process described above.

If the content of an instruction received from the terminal apparatus 2 is to cause the image formation unit 17 included in the reading apparatus 1 to form an image represented by image data generated by the reading unit 16 on a medium, the reading apparatus 1 determines the reading process is successful when the image is formed on a medium by the image formation unit 17, and bills the second user.

3-6. Sixth Modification

Each program executed by the controller 11 of the reading apparatus 1 or the controller 21 of the terminal apparatus 2 may be provided with being stored on a computer readable recording medium, such as a magnetic recording medium such as a magnetic tape or a magnetic disk, an optical recording medium such as an optical disc, a magneto-optical recording medium, or a semiconductor memory. Alternatively, this program may be downloaded via a communication network, such as the Internet. As controllers that are described as the controller 11 and the controller 21, various devices other than the CPU may be used. For example, a dedicated processor or the like is used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reading system comprising:
a reading apparatus; and
a terminal apparatus that transmits an instruction to the reading apparatus,
wherein the reading apparatus includes
an identification unit that identifies a first user,
a reading unit that reads an original document,
a reception unit that receives, from the terminal apparatus, authentication information of a second user and an instruction given to the reading apparatus,
an authentication unit that performs authentication by using the authentication information, and
a permission unit that permits, if authentication performed by the authentication unit is successful, the reading unit to read an original document in accordance with the instruction received by the reception unit, and
wherein the terminal apparatus includes
a first acquisition unit that acquires, from the reading apparatus, identification information of the first user identified by the identification unit in the reading apparatus,
an acceptance unit that accepts an operation performed by the second user,
a second acquisition unit that acquires identification information of the second user in the terminal apparatus, and
a transmission unit that transmits, if the identification information of the first user acquired by the first acquisition unit and the identification information of the second user acquired by the second acquisition unit satisfy a certain condition, an instruction corresponding to the operation accepted by the acceptance unit and the authentication information to the reading apparatus.

2. The reading system according to claim 1,
wherein the reading apparatus further includes
a reading controller that accepts an operation performed by the first user and that causes the reading unit to read an original document in response to the operation, and
a restriction unit that restricts the reading controller from accepting an operation or restricts the reading unit from reading an original document in response to an operation accepted by the reading controller, for a period during which the reading unit is permitted to read the original document by the permission unit.

3. The reading system according to claim 2,
wherein the reading apparatus further includes
an informing unit that informs the first user that restriction is imposed by the restriction unit for the period.

4. The reading system according to claim 1,
wherein the reading apparatus further includes
a billing unit that performs, upon the terminal apparatus receiving a result for the instruction from the reading apparatus, processing for billing the second user by using billing information of the second user stored in the terminal apparatus.

5. A reading system comprising:
a reading apparatus; and a terminal apparatus that transmits an instruction to the reading apparatus, wherein the reading apparatus includes
an identification unit that identifies a first user,
a reading unit that reads an original document,
a reception unit that receives, from the terminal apparatus, authentication information and an instruction given to the reading apparatus, the authentication information containing identification information of a second user,
an authentication unit that performs authentication by using the authentication information, and
a permission unit that permits, if identification information of the first user identified by the identification unit and the identification information of the second user satisfy a certain condition and authentication performed by the authentication unit is successful, the reading unit to read an original document in accordance with the instruction received by the reception unit, and wherein the terminal apparatus includes
an acceptance unit that accepts an operation performed by the second user,
an acquisition unit that acquires the authentication information in the terminal apparatus, and
a transmission unit that transmits, to the reading apparatus, an instruction corresponding to the operation accepted by the acceptance unit and the authentication information.

6. The reading system according to claim 5,
wherein the reading apparatus further includes
a reading controller that accepts an operation performed by the first user and that causes the reading unit to read an original document in response to the operation, and
a restriction unit that restricts the reading controller from accepting an operation or restricts the reading unit from reading an original document in response to an operation accepted by the reading controller, for a period during which the reading unit is permitted to read the original document by the permission unit.

7. The reading system according to claim 6,
wherein the reading apparatus further includes
an informing unit that informs the first user that restriction is imposed by the restriction unit for the period.

8. The reading system according to claim 5,
wherein the reading apparatus further includes
a billing unit that performs, upon the terminal apparatus receiving a result for the instruction from the reading apparatus, processing for billing the second user by using billing information of the second user stored in the terminal apparatus.

9. A terminal apparatus comprising:
an acquisition unit that acquires identification information of a first user from a reading apparatus that reads an original document, the identification information being acquired by the reading apparatus;
an acceptance unit that accepts authentication information of a second user and an instruction to perform a reading process in the reading apparatus; and
a transmission unit that transmits, if the identification information matches the authentication information, the instruction and the authentication information to the reading apparatus, and that does not transmit, if the identification information does not match the authentication information, the instruction and the authentication information to the reading apparatus.

10. A reading apparatus comprising:
a reading unit that reads an original document;
an acquisition unit that acquires identification information of an operator who operates the reading apparatus;
a reception unit that receives authentication information of an operator who operates a terminal apparatus and an instruction given to the reading apparatus; and
an authentication unit that performs authentication by using the authentication information,
wherein the reading unit reads, if the identification information and the authentication information satisfy a certain condition and authentication performed by the authentication unit is successful, an original document in accordance with the instruction.

11. An information processing method comprising:
identifying a first user in a reading apparatus;
acquiring, from the reading apparatus, identification information of the identified first user;
accepting an operation performed by a second user in a terminal apparatus;
acquiring identification information of the second user in the terminal apparatus;
transmitting, if the acquired identification information of the first user and the acquired identification information of the second user satisfy a certain condition, an instruction corresponding to the accepted operation and authentication information of the second user to the reading apparatus from the terminal apparatus;
receiving, from the terminal apparatus, the authentication information of the second user and the instruction given to the reading apparatus;
performing authentication by using the received authentication information in the reading apparatus;
permitting, if the authentication is successful, reading of an original document in accordance with the received instruction in the reading apparatus; and
reading the original document in the reading apparatus.

12. An information processing method comprising:
acquiring identification information of a first user from a reading apparatus that reads an original document;
accepting authentication information of a second user and an instruction to perform a reading process in the reading apparatus; and
transmitting, if the identification information matches the authentication information, the instruction and the authentication information to the reading apparatus, and stopping transmitting, if the identification information does not match the authentication information, the instruction and the authentication information to the reading apparatus.

* * * * *